INVENTORS
William F. Drew
Harry O. Drew

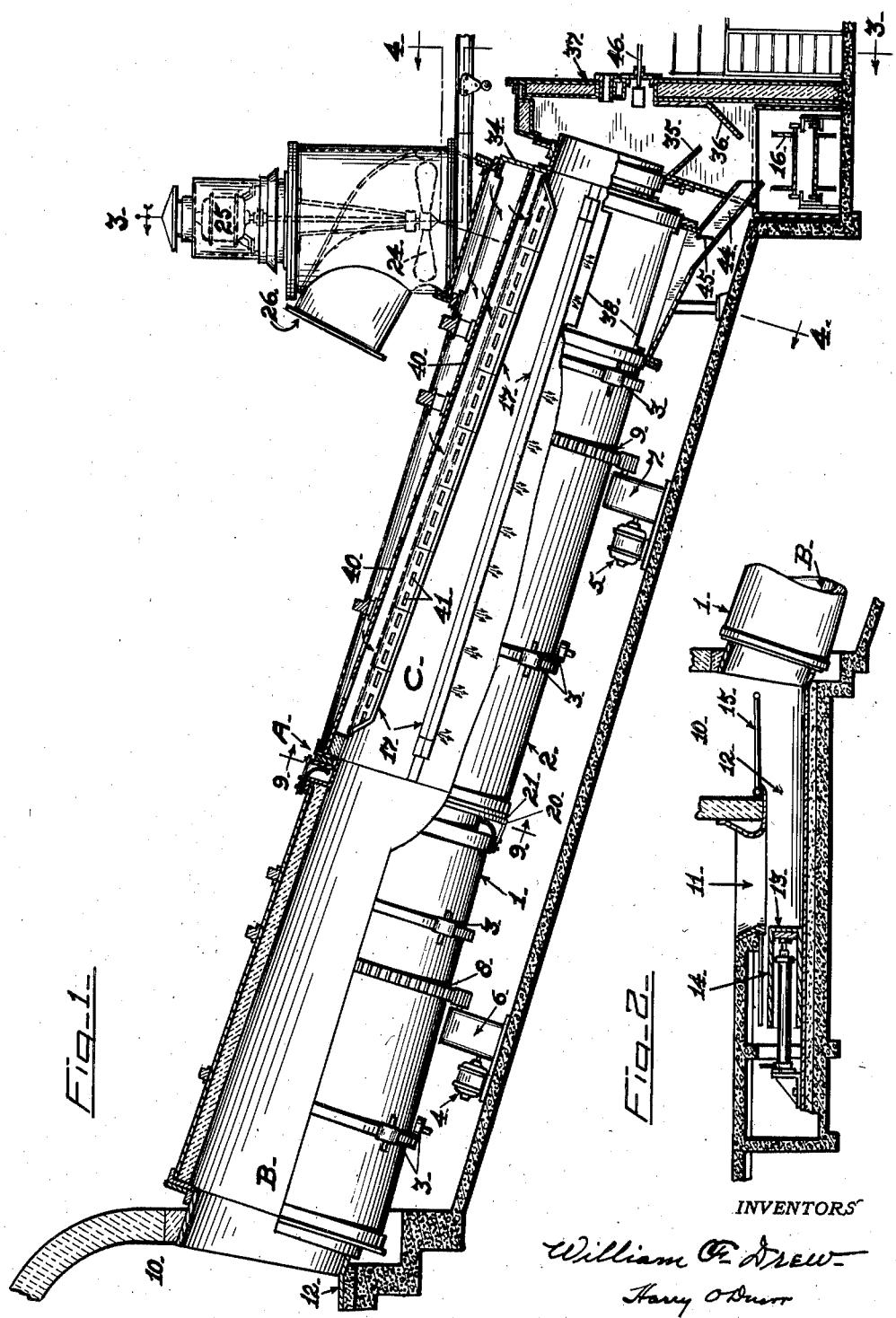

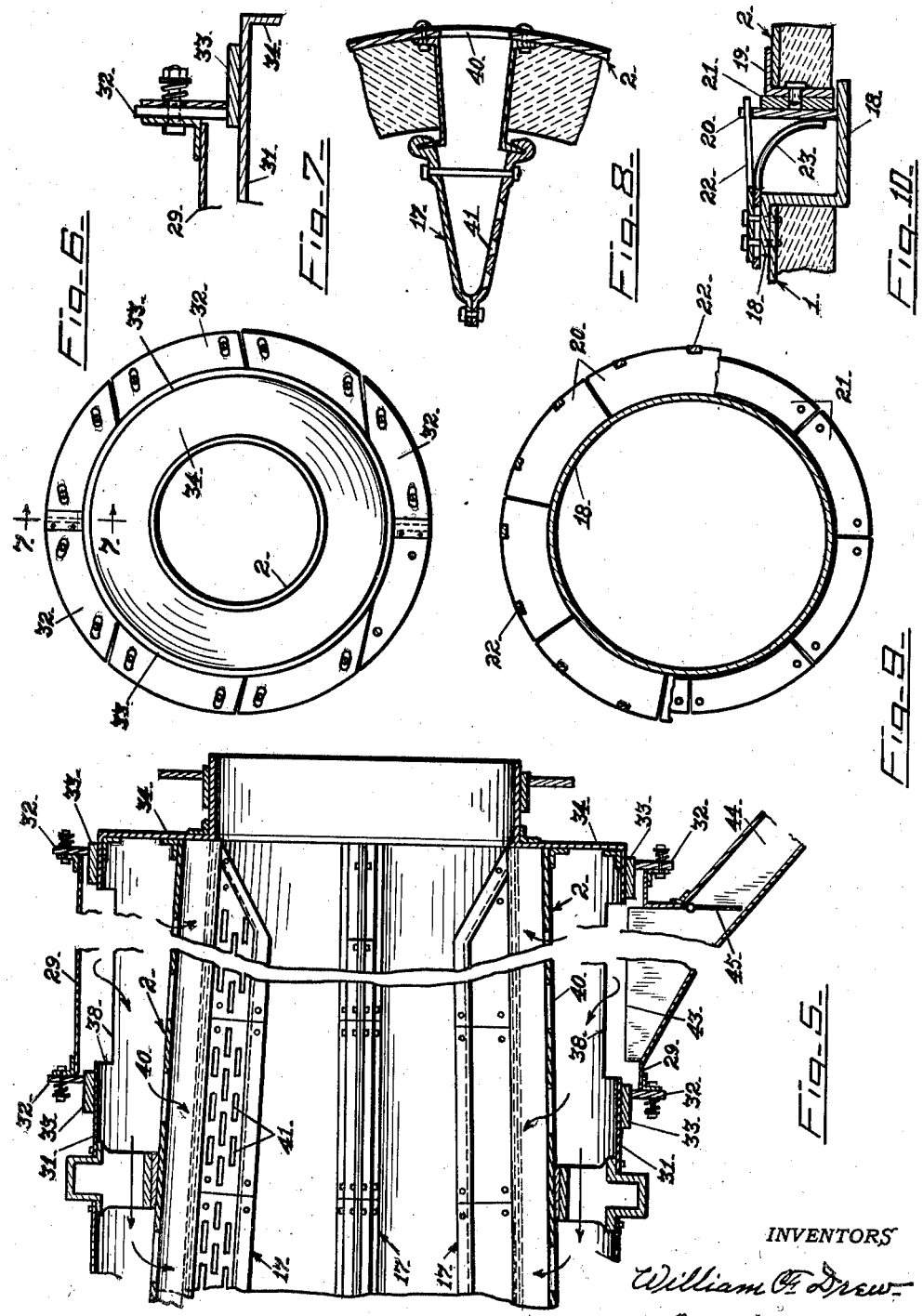

Patented Apr. 15, 1941

2,238,161

UNITED STATES PATENT OFFICE 2,238,161

TANDEM ROTARY INCINERATOR

William F. Drew and Harry O. Duerr, Los Angeles, Calif.

Application April 23, 1938, Serial No. 203,919

9 Claims. (Cl. 110—14)

This invention relates to improvements in the art of incinerating waste and refuse matter and takes into consideration the provision of incinerator units, devices, and elements of such construction, relative arrangement and combination, and method steps of such nature, that any incinerating apparatus embodying one or more of such units, devices and elements, or any incinerating method embodying one or more such steps to the end of increasing incineration efficiency, will come within the purview of this invention, although the embodiment here shown and described is characterized by a tandem rotary combustion chamber including relatively movable sections and other and special features of construction and arrangement to afford even greater efficiency; it being the primary object hereof to provide a method and an apparatus for more thoroughly incinerating large quantities of matter in less time and with greater efficacy than heretofore possible, through the use of any workable system which may be carried out in the light of the disclosures hereof.

More specifically an object of this invention is to increase the efficiency of an incinerator by employment of a tandem rotary combustion chamber including relatively rotatable sections whereby to rotate the same at different speeds to best maintain and control combustion therein in consideration of the nature of waste and refuse matter and the desired rate of combustion of large quantities thereof with a minimum of combustibles in the residue.

Moreover, the invention further consists in the provision of a novel and efficient means for automatically controlling the volume of air introduced into the combustion chamber to best promote and maintain combustion of a large quantity of matter, fed thereto at a desired rate to produce the highest efficiency with the lowest proportion of unconsumed residue, this control being effected by introducing the air through the mass of matter in the incinerator in greater volume than is elsewhere introduced, whereby to aerate the mass of matter and best support combustion thereof.

With the above and other objects in view the invention consists in the novel construction and combination of parts hereinafter described, illustrated in the accompanying drawings, and set forth in the claims hereto appended, it being understood that various changes in form, proportion, size and minor details of construction within the scope of the claims may be resorted to without departing from the spirit of sacrificing any of the advantages of the invention.

Referring to the drawings:

Figure 1 represents a side elevation partly in section of an incinerator constructed in accordance with this invention.

Figure 2 is a fragmentary longitudinal section of the feed means.

Figure 5 is an enlarged fragmentary vertical section showing the detailed construction of the lower combustion chamber.

Figure 6 is an end reduced elevation of the part of the chamber shown in Figure 5.

Figure 7 is an enlarged fragmentary sectional view taken on the plane of line 7—7 of Figure 6.

Figure 8 is an enlarged fragmentary sectional view of one of the agitating and aerating vanes.

Figure 9 is an enlarged sectional view taken on the plane of line 9—9 of Figure 1.

Figure 10 is an enlarged fragmentary longitudinally sectional view of the joint uniting tandem shells.

Figure 4:
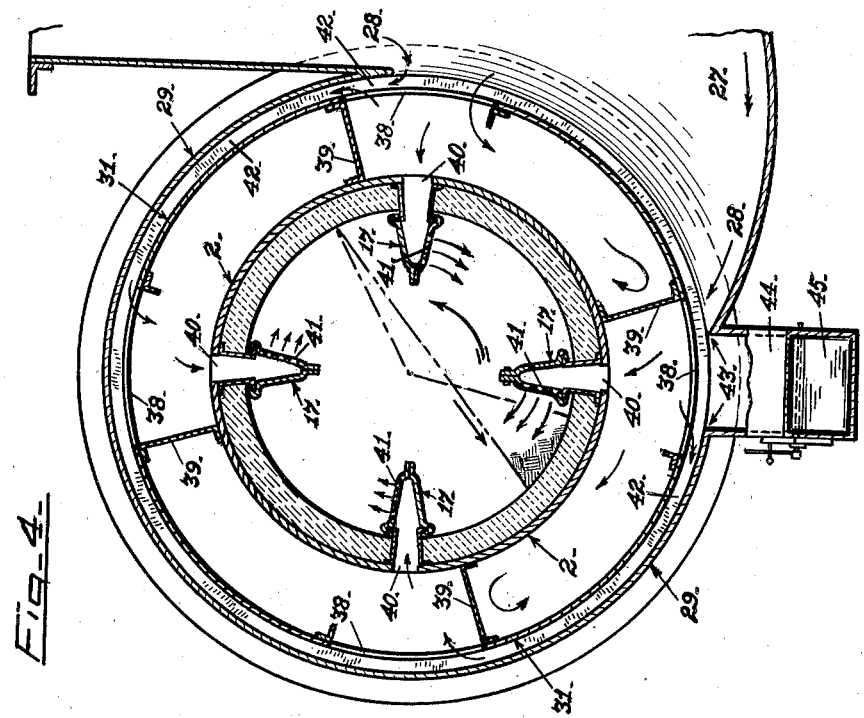
Figure 4 is an enlarged vertical section taken on the plane of line 4—4 of Figure 1.

One form of incinerator which may be constructed in accordance with this invention, is illustrated in detail in the accompanying drawings and essentially includes a tandem rotary combustion chamber A providing contiguous primary and secondary combustion sections or chambers B and C. These sections or chambers are arranged to be rotated at relative speeds to best maintain and control combustion therein, in consideration of conditions at hand and the nature of the waste, refuse or garbage matter being fed thereto and whereby to increase the incinerating capacity and otherwise add to the efficiency of the incinerator as will be hereinafter more fully described.

As here provided the tandem chamber A is inclined and preferably gradually or otherwise reduced in diameter towards the lower end of the unit, and the chambers or sections B and C are preferably disposed in a common inclined plane and reduced in diameter in such manner that the overall combustion chamber area is uniformly tapered from one end of the unit to the other. The inclination angle is small to prevent waste and refuse matter from freely gravitating through the tandem chamber and, therefore, rotation of the chamber and other forces are provided to effect a controlled movement of said matter through said chambers, it being necessary to maintain the matter in the relative chambers for sufficient time to insure thorough combustion thereof. Inasmuch as particles of the refuse and waste matter are highly combustible and other particles are slow burning and require a comparatively longer period of time to be incinerated, it is seen that by having the sections B and C of the tandem chamber rotatable at different speeds, the incinerator may be more efficiently operated, in that it will provide for a more thorough combustion of larger quantities of matter of varying degrees of combustibility, in a short time than heretofore possible. It is evident that when an incinerator having a single rotary and inclined chamber, has the waste and refuse matter fed thereto at such a rate and is rotated at a speed suitable for effecting an efficient continuous combustion therein of large quantities of matter, the paper and other highly combustible components of the waste and refuse matter will be quickly burned in the upper part of the chamber whereas the slow burning components in too great a proportion are sometimes discharged from the chamber before being completely incinerated. In other words a speed of rotation of the chamber essential to continuous feed of quantities of matter thereto and the proper burning of the majority of said matter, is often too great or such that the lesser combustible particles will be discharged from the chamber before being properly incinerated. Thus it is seen that by rotating the primary chamber B at a rate of speed which will provide for the maximum capacity feed and a capacity combustion of the highly or readily combustible components of the matter contained therein, while at the same time rotating the contiguous secondary chamber C at such a slower speed as will insure retention of the lesser combustibles therein long enough to be properly incinerated, we are able to provide better combustion in, and increase the capacity of an incinerator, and reduce to a minimum the amount of combustible residuals discharged therefrom. Moreover, it is seen that the intensity of the reflected heat is greater in the smaller chamber C and further intensified towards the lower end thereof due to the conical or tapered formation of the combustion chamber and therefore this intensified heat insures a thorough combustion of the relatively slower moving matter in the secondary chamber C. The taper also acts to retard the flow of matter through said chamber and the rate of retardation progressively increases towards the lower and smaller end of said chamber.

As here shown the tandem combustion chamber A is made up of contiguous tubular and conical shells 1 and 2 supported in inclined position for relative rotation by means of suitable structures, portions of which are indicated at 3 in Figure 1. These shells may be relatively rotated by any suitable means, such as the prime movers 4 and 5, speed changing devices 6 and 7 and drive means 8 and 9 operated thereby as shown in Figure 1.

The upper end of the primary shell 1 defining the primary combustion chamber B is arranged to discharge into a flue or chamber 10 and thence to the atmosphere. An extension 12 of a feed bin 11 is disposed between said bin and the upper end of the primary combustion chamber B and is provided with a suitable plunger device 13 adapted to push successive charges of matter from the bin into the combustion chamber B, said plunger means having a portion 14 thereof adapted to act as a gate closing the connection between the bin 11 and extension 12 during stroke movements of the plunger. A baffle or guide 15 guides the matter into the chamber B and prevents the pushing of said matter upwardly into the flue or chamber 10. A conveyor means 16 is provided at the lower end of the shell 2 to remove ashes and noncombustible matter discharged from said lower end.

As here shown the shell 1 is conical and has a refractory lined bore defining the primary chamber B, whereas the shell 2 defining the secondary chamber C is refractory lined and provided with a series of hollow agitating and aerating vanes 17 interiorly thereof. Shell 2 is also conical and matches the conical form of shell 1 as a continuation of the latter.

Referring to Figures 1, 9 and 10 it is seen that the shells 1 and 2 are relatively rotatably coupled by rings 18 and 19 of angular cross section secured by any suitable manner to the opposed ends of said shells and supporting annular wear plates 20 and 21, there being springs 22 and 23 for yieldably holding said plates in sealing engagement with one another and said rings. This construction makes possible the relative rotation of said shells while maintaining a sealed joint between them.

The efficiency of the incinerative action and the means productive thereof as will be hereinafter described for the chamber B, will be equally efficacious in incinerators consisting of a single unit.

By the means herein provided in connection with chamber C, the quantity of air desirable to maintain combustion is controlled so as to provide the threefold purpose of first, automatically admitting a requisite proportional quantity of fresh air throughout substantially the length of the chamber to freely commingle with the gases of combustion in the chamber "space" or "passage" and thereby more properly support this stage of combustion; second, forcibly introducing the larger proportional quantity of air directly into and under the bed of matter during its "rolling" and progressive movement through substantially the full length of the chamber and thirdly, forcibly aerating and rekindling the cinders and lighter particles present on the surfaces of the mass just previous and subsequent to certain positions of the air inlet means with relation to the bed of matter, in other words, before entering and leaving submersion in the mass.

As here shown the secondary chamber C is supplied with air by means of a suitable fan or blower 24 (driven by suitable means as the motor 25) arranged to intake air, hot air or gas, from a suitable source not shown, through an intake 26. The discharge of this blower is connected by a throat 27, Figures 3 and 4, with an opening 28 in a cylindrical shell or drum 29 fixed by supporting means 30 so as to surround the lower end of the shell 2 as shown in Figures 1, 3, 4 and 5. In this connection, it should be noted that the shell 2 is surrounded by a cylindrical outer jacket or shell 31 which with shell 2 defines an annular air chamber extending substantially the length of shell 2 and gradually increasing in diameter towards the lower end thereof. The lower end of the cylindrical outer casing 31 is rotatably joined to the drum 29 by means of the spring urged wear plates 32, Figures 5, 6 and 7, carried by said drum and engaging the collars or bands 33 on the casing 31. The lower end of the casing 31 is telescoped by said drum and provides an annular closure wall 34 for the air space between it and said shell. The shell 2 extends beyond said wall 34 as a discharge spout as seen in Figures 1 and 5. Ashes and non-combustible matter will discharge from this spout onto baffles 35 and 36, Figures 1 and 3, as part of the chamber forming structure 37 housing the discharge end of the chamber C, and thence drop onto the conveyor 16.

Extending longitudinally in the lower end of the casing 31 are elongated air intake openings 38, Figures 4, 5 and 1, adapted to register with the opening 28 in the drum 29. These openings are opposite the vanes 17 and equal in number thereto. Partition plates 39 extending between the shell 2 and casing 31, divide the air space therebetween into longitudinal sections, each of which communicates with a hollow vane 17 through a series of openings 40 longitudinally spaced in the shell 2. Each of said vanes is provided with a longitudinally extended series of openings 41 for discharging jets of air into the interior of the chamber C.

Figure 3:
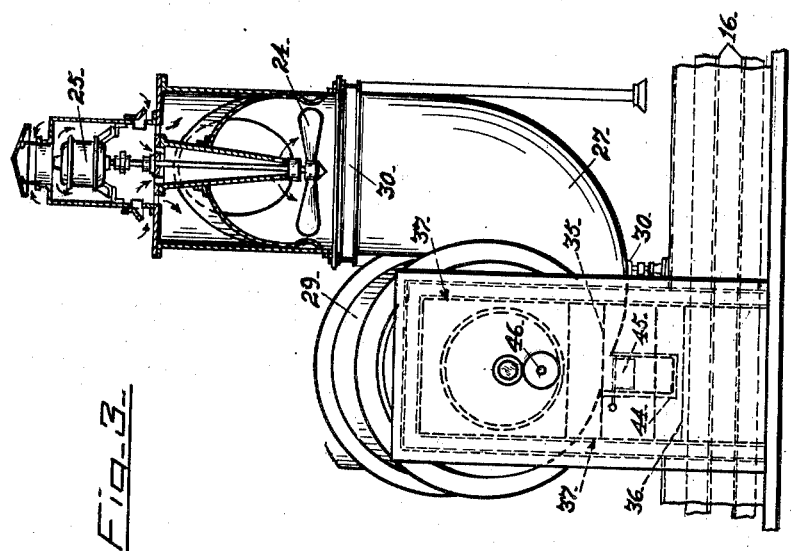
Figure 3 is a vertical section taken on the plane of line 3—3 of Figure 1.

With particular reference to Figure 4 it is seen that the casing 31 is circumferentially spaced from the drum 29 to define an annular air passage 42 which affords communication at all times of the intake opening 28 of the drum 29 with all of the openings 38, whereby air is forced at the same time to all of said vanes 17, but in varying amounts as will be hereinafter more fully described. Any ashes or other matter which may discharge from the chamber C through the vanes 17 will gravitate to the lower end of the space between the shell 2 and casing 31 and then drop through an opening 43 in the lower side of the drum 29 onto an enclosed chute 44 which discharges onto the conveyor 16. In the chute 44 is a normally closed gate 45 arranged to open under the weight of ashes, etc. accumulated above it, said gate operating to prevent the blowing of air out through said chute. A suitable burner 46, Figures 1 and 3, is mounted at the lower end of the chamber C.

It is now seen that during the operation of the apparatus hereof, two of the openings 38, Figure 4, are maintained in direct registration with the opening 28 throughout the major portion of each revolution of the chamber C, whereby those of the vanes 17 which are embedded in or extend into the mass of matter in said chamber will discharge the greater volume of air into and throughout said mass, while the other vanes communicating with said opening 28 through the passages 42 will discharge lesser amounts of air, the vanes farthest removed from opening 28 discharging less air than the others. However, it should be noted that during such times that but one of the openings 38 is in registration with the opening 28 there will still be discharged into and through the mass of matter, through the vane opposite said one opening, a greater proportion of air than through the other vanes and thus it is seen that a greater volume of air is discharged at all times through the mass of matter in the chamber C, than is discharged in the area or zone of said chamber unoccupied by said mass. This is borne out by the fact that the air forced directly from blower throat 27 through the opening 28 into the opening or openings 38 then in registration with opening 28, will be more forcibly and in greater volume, directed through the vanes which are opposite and in direct registration with said openings 38, as compared to the volume of air which is forced through the passages 42 into the vanes. By having the opening 28 positioned and of such size, as shown in Figure 4, with respect to the normal position assumed by the mass of matter during rotation of the chamber C, and in consideration of the length of the openings 38 and their spacing as well as the spacing of the vanes 17, the mass of matter is continuously aerated by jets of air under pressure being forced therethrough, and for the most part by two of the vanes. As soon as one vanes moves clear of the mass another is about to enter and only a short interval elapses until the second vane enters the mass. Upon the entry of a vane 17 into, and upon its movement clear of the mass, the opening 38 therefor is in registration with said opening 28 and this provides for effectingly directing jets of air onto the surface of the mass to aerate and rekindle the cinders and lighter particles on said surface. However, any suitable means may be employed for introducing air or gas from a blower or from any other source of supply of air or gas under pressure into the chamber unit through the wall thereof or otherwise, provided said means will, first, automatically direct a requisite proportional quantity of air or gas throughout the chamber space unoccupied by the mass, to thoroughly support this stage of combustion; secondly, forcibly introduce the larger proportional quantity of air as penetrating jets through, into and under the mass during the rolling, agitating and moving thereof throughout the length of said chamber; and thirdly, forcibly aerate and rekindle the cinders and lighter particles on the surface of said mass by directing said forceful mass penetrating jets of air onto or through said surface just previous and subsequent to direction of said jets through and from points within said mass.

With reference to the foregoing description and accompanying drawings it will be seen that this invention resides in the provision of a new method and an apparatus for more thoroughly incinerating large quantities of waste and refuse matter in less time and with greater efficacy than possible with the methods and equipment heretofore used.

We claim:

1. A tandem rotary incinerator including inclined, tubular, rotary and contiguous shells having bores which vary in diameter and provide a tandem combustion chamber which is reduced in diameter towards the lower end thereof, and means for joining said shells, and means for rotating said shells at different speeds.

2. A tandem rotary incinerator including tubular inclined rotary shells arranged contiguously and having tapered bores forming a tandem combustion chamber having a progressively reduced diameter from the upper to the lower end thereof and means for joining said shells whereby they may be relatively rotated.

3. A tandem rotary incinerator including inclined relatively rotatable and tubular shells arranged contiguously and having bores tapering towards the lower ends thereof and which define contiguous relatively rotatable combustion chambers, means for effecting relative rotation of said shells, and means for introducing air to support combustion throughout substantially the entire length of the lowermost shell.

4. A tandem rotary incinerator including inclined relatively rotatable and tubular shells arranged contiguously and having bores defining contiguous relatively rotatable combustion chambers of, and means for effecting relative rotation of said shells, and means for forcing air through said chambers including means for introducing jets of air at longitudinally spaced points throughout substantially the entire length of the lowermost shell.

5. A tandem rotary incinerator including inclined relatively rotatable and tubular shells arranged contiguously and having bores defining adjoining combustion chambers, means whereby said shells may be relatively rotated to effect movement of waste and refuse matter contained therein, and means for introducing air to support combustion into said shells including means for directing jets of air under pressure at spaced points throughout the length of one of said chambers.

6. A tandem rotary incinerator including inclined relatively rotatable and tubular shells arranged contiguously and having bores defining adjoining combustion chambers, means whereby said shells may be relatively rotated to effect movement of waste and refuse matter contained therein, means for introducing air to support combustion into said shells including means for directing jets of air under pressure at spaced points throughout the length of the lowermost of said chambers, and means for controlling the volume of air so as to introduce the greater volume through the mass of matter in the lowermost shell.

7. An incinerator including an inclined rotary tubular shell the bore of which serves as a combustion chamber, a tubular jacket surrounding said shell for rotation therewith and spaced therefrom for forming an annular air chamber throughout the length of the shell, means for closing the ends of said air chamber, a fixed annular drum surrounding the lower end of said jacket and circumferentially spaced therefrom to define therewith an annular air passage, means at the ends of said drum for engaging the jacket to close said air passage, said drum having an air intake opening, said jacket having an air intake opening in constant communication with said air passage and arranged to be brought into and out of direct communication with the air intake opening of said drum upon rotation of said shell and jacket, and means providing for introducing jets of air from said air chamber through said shell and into the combustion chamber, at points spaced apart longitudinally throughout the length of said shell, said drum having an ash outlet disposed to communicate with said air intake opening of said jacket whereby ashes which have fallen from said shell into the jacket will be gravitationally discharged therefrom, and a valve arranged to normally close said outlet against the escape of air from said drum and to be opened by the weight of ashes thereagainst.

8. A tandem rotary incinerator including relatively rotatable tubular shells arranged end to end, and means for rotatably joining said shells including annular coacting members on the adjacent ends of said shells forming an annular pocket, segmental plates in said pocket for sealing the joint between said members and spring means for urging said sealing plates both radially and longitudinally into sealing contact with said members.

9. A tandem rotary incinerator including tubular rotary shells arranged contiguously so that their bores form a tandem combustion chamber, means for joining said shells whereby they may be relatively rotated, and means for introducing air to support combustion throughout substantially the entire length of one of the shells.

WILLIAM F. DREW.
HARRY O. DUERR.